(12) United States Patent
Schmidt et al.

(10) Patent No.: US 7,644,500 B2
(45) Date of Patent: Jan. 12, 2010

(54) METHOD OF SETTING THE PRE-LOAD FOR A BALL SOCKET JOINT

(75) Inventors: George Schmidt, St. Louis, MO (US); Larry Fitch, Chakokia, IL (US); Donald Doherty, St. Peters, MO (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 324 days.

(21) Appl. No.: 11/332,886

(22) Filed: Jan. 17, 2006

(65) Prior Publication Data

US 2007/0163100 A1     Jul. 19, 2007

(51) Int. Cl.
*B21K 1/10*     (2006.01)
*F16C 11/00*    (2006.01)

(52) U.S. Cl. .................. 29/898.044; 29/441.1; 403/135

(58) Field of Classification Search .................. 29/898, 29/898.044, 441.1, 898.043, 898.048, 898.049, 29/898.05, 434; 403/132, 135–138, 140, 403/142, 143; 384/206
See application file for complete search history.

(56) References Cited

U.S. PATENT DOCUMENTS

| | | | |
|---|---|---|---|
| 1,829,964 A | 11/1931 | Randall | 403/38 |
| 2,037,786 A | 4/1936 | Hufferd | 403/127 |
| 2,115,087 A | 4/1938 | Schaefer | 403/136 |
| 2,471,672 A | 5/1949 | Booth | 403/132 |
| 2,494,739 A | 1/1950 | Booth | 403/127 |
| 2,507,087 A | 5/1950 | Booth | 403/36 |
| 2,544,584 A | 3/1951 | Booth | 403/127 |
| 2,631,044 A | 3/1953 | Booth | 280/96.2 |
| 2,708,590 A | 5/1955 | Latzen | 403/138 |
| 2,878,046 A | 3/1959 | Latzen | 403/130 |
| 2,880,025 A | 3/1959 | Herbenar et al. | 403/133 |
| 2,912,267 A | 11/1959 | Latzen | 403/130 |

(Continued)

FOREIGN PATENT DOCUMENTS

GB     2099909 A     12/1982

(Continued)

OTHER PUBLICATIONS

Picture from 1986 GM part No. 260000076.

*Primary Examiner*—David P Bryant
*Assistant Examiner*—Ryan J Walters
(74) *Attorney, Agent, or Firm*—Robert L. Stearns; Dickinson Wright, PLLC

(57) ABSTRACT

A method for assembling a ball and socket assembly (10) includes loading a housing (14) with a resilient preload washer (28), an inner bearing (30), a ball stud (12) and an outer bearing (36). A loading tool (50) forcefully compresses the assembled components, as a unit, to an overload compression condition (54), and then reduces the compression until an ideal compression condition (56) is achieved. The outer bearing (36) is staked in position while the loading tool (50) holds the assembled components in the ideal compression condition (56). Following the staking operation, the loading tool (50) can be removed, and a final crimping operation permanently sets the outer bearing (36) in position and holds the articulating components in the ideal, pre-load clearance established. The subject method is particularly well-suited for high production set-ups in which precise pre-load clearances must be achieved at high through put rates.

15 Claims, 3 Drawing Sheets

U.S. PATENT DOCUMENTS

| | | | | |
|---|---|---|---|---|
| 2,972,496 | A | 2/1961 | Herbenar et al. | 403/126 |
| 2,973,980 | A | 3/1961 | Vogt et al. | 403/133 |
| 2,993,717 | A | 7/1961 | Gottschald | 403/133 |
| 3,027,182 | A | 3/1962 | Reuter | 403/134 |
| 3,066,963 | A | 12/1962 | Vogt | 403/138 |
| 3,073,634 | A | 1/1963 | Gottschald | 403/139 |
| 3,095,224 | A | 6/1963 | Langen et al. | 403/138 |
| 3,102,744 | A | 9/1963 | Reuter et al. | 403/138 |
| 3,128,110 | A | 4/1964 | Herbenar | 403/138 |
| 3,168,339 | A | 2/1965 | Townsend | 403/138 |
| 3,259,408 | A | 7/1966 | Herbenar | 403/138 |
| 3,272,541 | A | 9/1966 | Latzen | 403/138 |
| 3,273,909 | A | 9/1966 | Moller et al. | 280/86.756 |
| 3,282,602 | A | 11/1966 | Willingshofer et al. | 280/124.134 |
| 3,290,074 | A | 12/1966 | Korecky | 403/132 |
| 3,343,855 | A | 9/1967 | Husen | 403/51 |
| 3,350,121 | A | 10/1967 | Townsend | 403/131 |
| 3,363,999 | A | 1/1968 | Gary | 44/392 |
| 3,395,441 | A | 8/1968 | Herbenar | 29/441.1 |
| 3,395,442 | A | 8/1968 | Herbenar | 29/441.1 |
| 3,410,587 | A | 11/1968 | Scheublein, Jr. et al. | 403/135 |
| 3,418,011 | A | 12/1968 | Scheublein, Jr. et al. | 403/125 |
| 3,423,114 | A | 1/1969 | Gottschald | 403/51 |
| 3,430,327 | A | 3/1969 | Herbenar | 29/243.517 |
| 3,464,723 | A | 9/1969 | Herbenar | 403/140 |
| 3,578,365 | A | 5/1971 | Gottschald et al. | 287/87 |
| 3,596,916 | A | 8/1971 | Gottschald et al. | 277/212 |
| 3,686,742 | A | 8/1972 | Herbenar | 29/441 |
| 3,820,908 | A | 6/1974 | Maxeiner et al. | 403/133 |
| 3,834,727 | A | 9/1974 | Adams | 280/96 |
| 3,847,490 | A | 11/1974 | Uchida | 403/140 |
| 3,849,009 | A | 11/1974 | Bourdon | 403/133 |
| 3,849,010 | A | 11/1974 | Herbenar | 403/138 |
| 3,891,336 | A | 6/1975 | Herbenar | 403/320 |
| 3,951,557 | A | 4/1976 | Herbenar | 403/138 |
| 3,959,006 | A | 5/1976 | Herrnring et al. | 106/42 |
| 3,988,818 | A | 11/1976 | Allison | 29/149.5 B |
| 3,999,872 | A | 12/1976 | Allison | 403/135 |
| 4,028,784 | A | 6/1977 | Allison | 29/149.5 B |
| 4,057,355 | A | 11/1977 | Allison | 403/2 |
| 4,059,361 | A | 11/1977 | Allison | 403/77 |
| 4,076,344 | A | 2/1978 | Gaines et al. | 308/72 |
| 4,187,033 | A | 2/1980 | Zukowski | 403/137 |
| 4,286,363 | A | 9/1981 | Morin | |
| 4,527,924 | A | 7/1985 | Asberg | 403/76 |
| 4,559,692 | A | 12/1985 | Morin | |
| 4,597,150 | A * | 7/1986 | Fister et al. | 29/407.02 |
| 5,011,320 | A * | 4/1991 | Love et al. | 403/132 |
| 5,022,779 | A | 6/1991 | Schnitzler | 403/138 |
| 5,066,160 | A | 11/1991 | Wood | 403/140 |
| 5,105,674 | A | 4/1992 | Rea et al. | |
| 5,116,159 | A | 5/1992 | Kern, Jr. et al. | |
| 5,154,530 | A | 10/1992 | Dresselhouse | 403/138 |
| 5,286,131 | A | 2/1994 | Wood | 403/138 |
| 5,533,490 | A | 7/1996 | Pascall | 123/538 |
| 5,564,853 | A | 10/1996 | Maughan | |
| 5,568,930 | A | 10/1996 | Urbach | 277/29 |
| 5,839,845 | A * | 11/1998 | Kincaid et al. | 403/135 |
| 6,010,271 | A | 1/2000 | Jackson et al. | 403/131 |
| 6,341,915 | B1 | 1/2002 | Kammel | |
| 6,422,779 | B1 | 7/2002 | Spagnulo | 403/138 |
| 6,533,490 | B2 | 3/2003 | Kincaid et al. | 403/133 |
| 6,533,491 | B1 | 3/2003 | Redele | 403/138 |
| 6,551,005 | B2 | 4/2003 | Da Silva Oliveira | 403/114 |
| 6,695,521 | B2 | 2/2004 | Kincaid et al. | 403/132 |
| 6,840,697 | B1 | 1/2005 | Dorr | 403/138 |
| 7,344,311 | B2 * | 3/2008 | Lu et al. | 384/206 |
| 7,421,785 | B2 * | 9/2008 | Spence et al. | 29/898.051 |
| 2002/0018692 | A1 | 2/2002 | Oliveira | 403/135 |
| 2002/0071716 | A1 | 6/2002 | Paduano | 403/137 |
| 2003/0044227 | A1 | 3/2003 | Parker | 403/135 |
| 2005/0001116 | A1 | 1/2005 | Vogt | 248/177.1 |
| 2005/0207684 | A1 | 9/2005 | Lu et al. | |
| 2005/0220531 | A1 | 10/2005 | Sellers et al. | |
| 2005/0235476 | A1 | 10/2005 | Spence et al. | |

FOREIGN PATENT DOCUMENTS

| | | |
|---|---|---|
| JP | 01193405 | 8/1989 |
| JP | 01193406 | 8/1989 |
| JP | 01203712 | 8/1989 |
| JP | 01203713 | 8/1989 |

\* cited by examiner

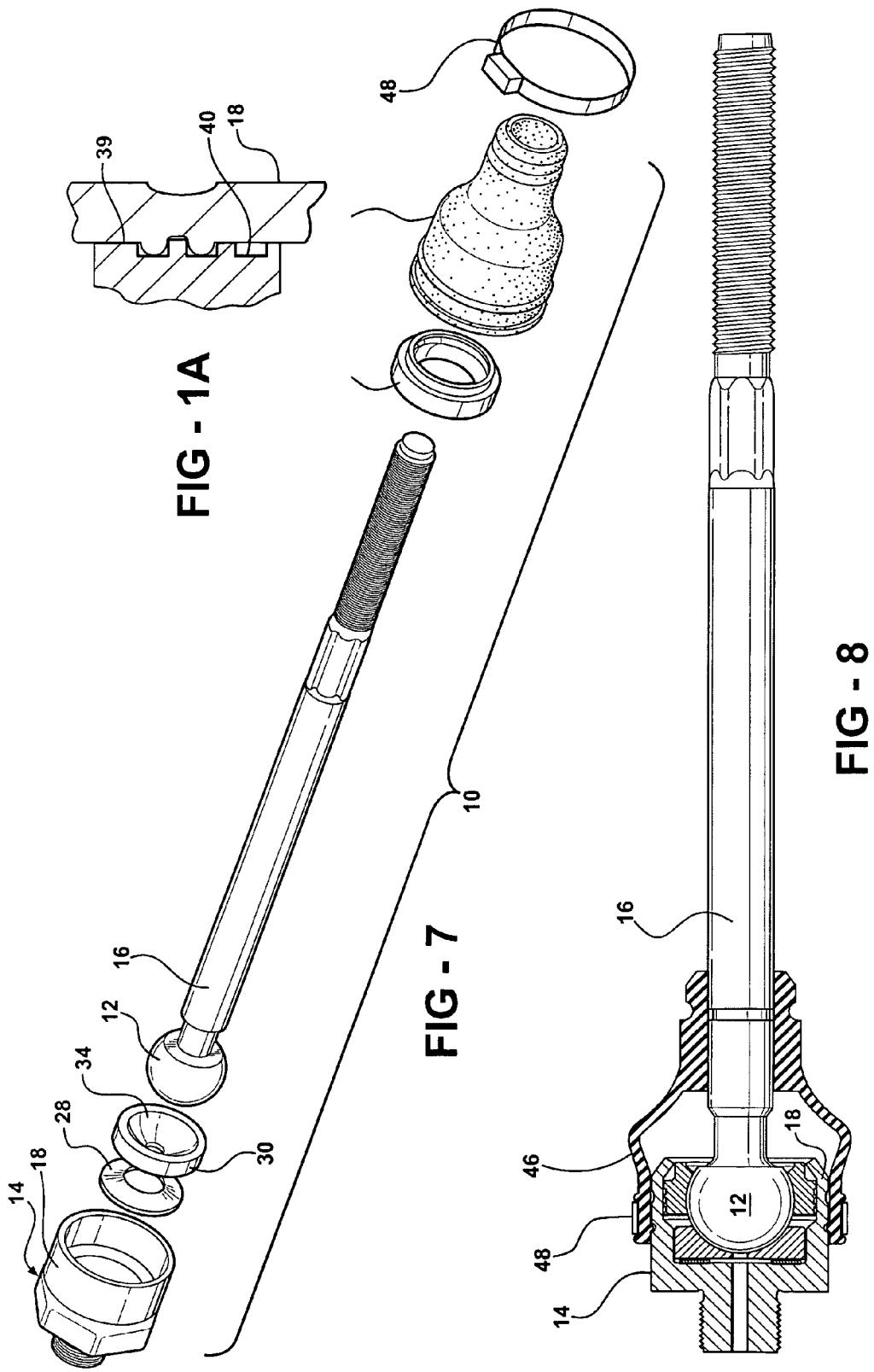

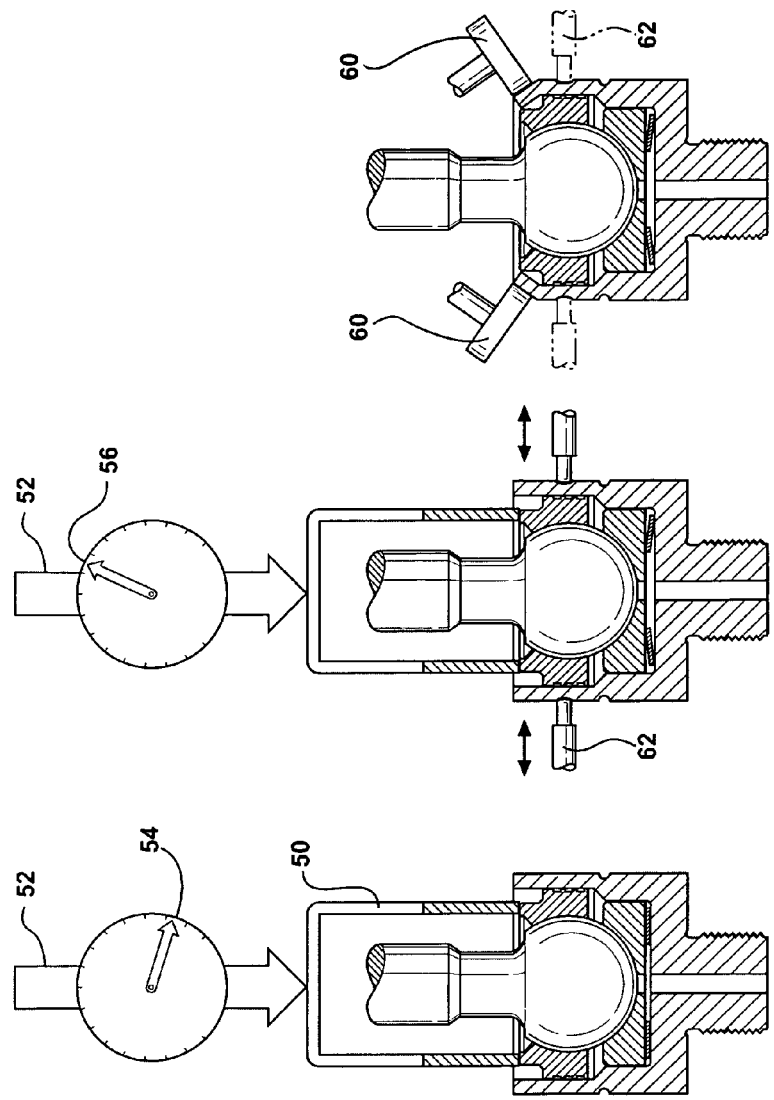
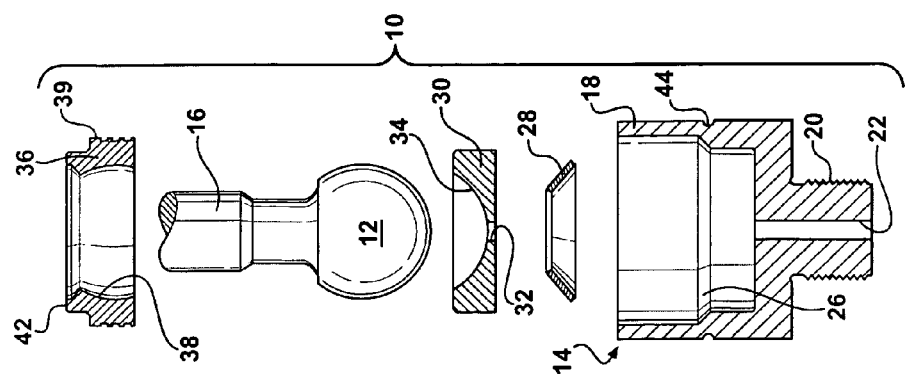

METHOD OF SETTING THE PRE-LOAD FOR A BALL SOCKET JOINT

BACKGROUND OF THE INVENTION

1. Field of the Invention

This invention relates to a ball and socket type joint of the type used in vehicular steering and chassis applications, and more particularly toward such a ball socket assembly in which a pre-established compressive load is captured between the articulating components during an assembly operation.

2. Related Art

Ball and socket type assemblies are typically used in vehicular applications where three-dimensional movement of a wheel, and in particular a steerable wheel, is required when a vehicle is turning and/or the suspension is accommodating movement over rough terrain. In the normal course of operation, ball sockets are subjected to very high stresses. These stresses are transmitted through the stud of the ball socket assembly into an associated suspension member, which may be a steering knuckle, control arm, steering link, rack and pinion unit or other feature.

In particularly demanding applications, such as, for example, experienced by off-road vehicles and commercial vehicles, it is sometimes desirable to fabricate the components in a ball and socket assembly from metallic compositions. Thus, an "all metal" design can provide enhanced durability as compared with the prior art, light-duty structures which incorporate plastic and/or elastomeric pre-loaded articulating components.

During the manufacturing assembly operation, the ball stud of a ball and socket type assembly is loaded into a housing and captured between outer and inner bearing pieces to establish the articulating joint. A resilient spring-like member is typically placed into service between the housing and the articulating components to facilitate the pre-load compression setting. This resilient member may comprise a Belleville washer or similar type spring component or may comprise a polymeric elastomer for this purpose. Such prior art light-duty ball and socket assemblies which utilize plastic and/or elastomeric components are relatively forgiving in their assembly methods needed to achieve and maintain a preload compression setting, as compared with the heavy-duty all metal designs. Rather, the more durable all metal type ball and socket assemblies have proven to be extremely sensitive to the pre-load compression stresses established during the assembly operations. This sensitivity frustrates high through-put manufacturing as well as complicates a consistent quality achievement in mass production settings. Accordingly, there is a need for an improved method of controlling the pre-load clearance in a ball and socket assembly, and in particular within such assemblies of the "all metal" type.

SUMMARY OF THE INVENTION

The subject invention comprises a method of assembling a ball-and-socket type mechanism with a permanent pre-load compression between the articulating components. The method comprises the steps of providing a housing, a resilient member, an inner bearing having a wear surface, an articulating ball stud, and an outer bearing having a wear surface. The method further includes placing into the housing the resilient member, the inner bearing against the resilient member, the ball stud in sliding contact with the wear surface of the inner bearing and the outer bearing with its wear surface in sliding contact with the ball stud. The outer bearing, ball stud and inner bearing are then compressed as a unit against the resilient member until an ideal compression condition is achieved. The ideal compression condition is maintained while the outer bearing is fixed in a set position in the housing to capture the ideal compression condition between the outer bearing, the ball stud and the inner bearing.

The subject invention provides a method for positioning and locking the outer bearing in position while the ideal compression is maintained. The subject invention is particularly advantageous in ball and socket type assemblies in which the pre-load compression and clearance is particularly sensitive. Such sensitivity arises in certain all metal component designs, but may also be an issue in some hybrid assemblies which may include non-metal bearing members as well.

According to another aspect of the invention, a method is provided for assembling an all-metal ball-and-socket type mechanism with a permanent pre-load compression between its articulating components. This method comprises the steps of: providing a metal housing, a metal resilient preload member, and metallic inner bearing having a wear surface, an articulating metal ball stud, and a metallic outer bearing having a wear surface; placing into the housing the resilient preload member, the inner bearing against the resilient preload member, the ball stud in sliding contact with the wear surface of the inner bearing, and the outer bearing with its wear surface in sliding contact with the ball stud; compressing the outer bearing, ball stud and inner bearing as a unit against the resilient preload member until an over-load compression condition or state is reached; reducing the compression load within the socket until an ideal compression condition is achieved between the outer bearing, ball stud and inner bearing; maintaining the ideal compression condition while simultaneously deforming the housing into the outer bearing so as to fix the outer bearing position in the housing and thereby capture the ideal compression condition within the all metal ball and socket mechanism. In a further aspect, the method may include a step of re-forming an up-standing edge of the housing to further effect a fixation of the bearing and the socket preload after the step of deforming the housing into the outer bearing. Alternatively, compressing the socket to an optimal preload without first overloading is an acceptable method of setting the socket preload.

BRIEF DESCRIPTION OF THE DRAWINGS

These and other features and advantages of the present invention will become more readily appreciated when considered in connection with the following detailed description and appended drawings, wherein:

FIG. 1A is an enlargement of section A of FIG. 1;

FIG. 3 is an exploded view of the ball and socket assembly as shown prior to an assembly operation;

FIG. 4 is a simplified view depicting the method step of compressing the outer bearing, ball stud and inner bearing as a unit against the resilient member until an over-compression condition is achieved;

FIG. 5 is a view as in FIG. 4, but depicting the method step of reducing the compression stress until an ideal compression condition is achieved, and maintaining that ideal compression condition while simultaneously deforming the housing into recesses in the outer bearing to secure the position of the outer bearing in the socket;

FIG. 6 is a view depicting the step of crimping an up-standing edge of the housing to complete the assembly operation;

FIG. 7 is an exploded perspective view of a complete ball and socket type mechanism according to the subject invention; and FIG. 8 is a side elevation view in partial cross-section of the assembled ball and socket type mechanism of FIG. 7.

DETAILED DESCRIPTION OF THE PREFERRED EMBODIMENT

Figure 2:
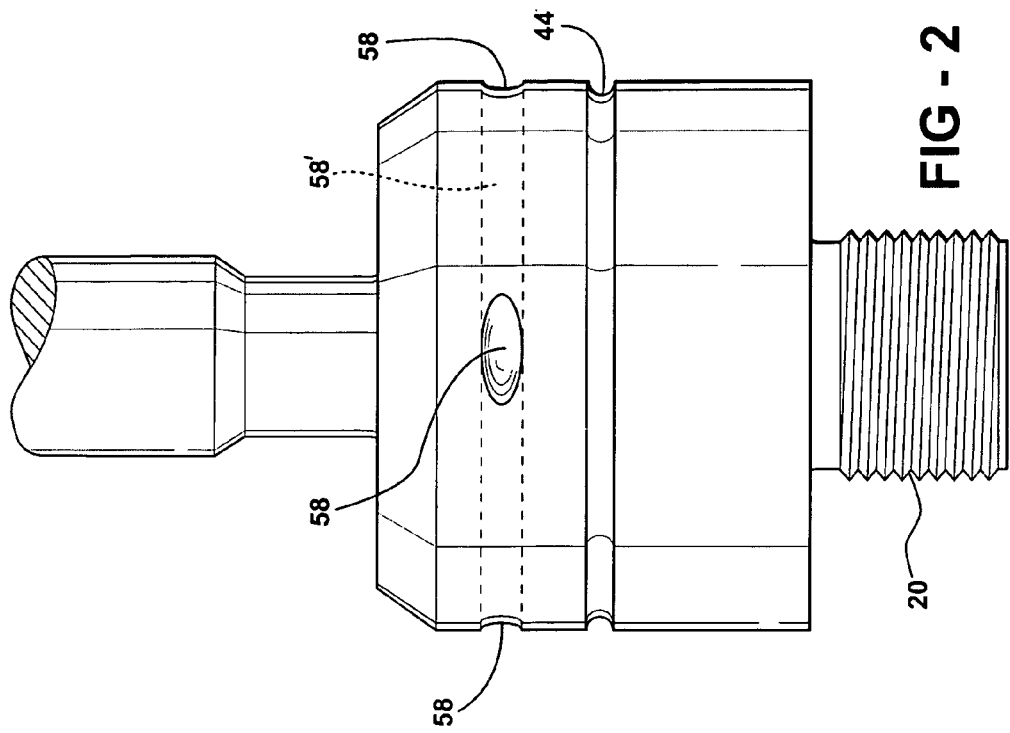
FIG. 2 is a elevation view of the ball and socket assembly of FIG. 1.

Referring to the Figures, wherein like numerals indicate like or corresponding parts throughout the several views, a ball-and-socket type mechanism is generally shown at 10. The ball and socket assembly 10 includes a ball portion 12 which is captured in a receiving socket of a ball joint housing, generally indicated at 14. Thus, the ball end 12 forms the male portion of a full articulating joint which facilitates the three-dimensional movement necessary to accommodate wheel turning and suspension travel in a vehicular chassis system. A shank 16 extends from the ball end 12 and acts as the anchoring device for connecting the ball joint assembly 10 within its intended application. For example, the shank 16 is shown in FIGS. 7 and 8 comprising an elongated shaft having a threaded end adapted to be connected, for example, to a vehicular suspension component.

The housing 14 is of the closed end type in which a generally cylindrical sidewall 18 is open at one end and closed at the other end. Housing 14 is preferably formed from a metal having sufficient ductility to permit deformation as localized described elsewhere herein, such as many grades of steel. The closed end, as shown in the Figures, includes a threaded post 20 to facilitate connection relative to a suspension component or anchoring feature. The threaded post 20 may include a lubrication passage 22 through which grease or other lubricant can be pumped into the sliding surfaces of the articulating joint. The cylindrical sidewall 18 has, at its open end, an up-standing edge 24, defining the entrance to an inner chamber 26. While generally circular in cross-section, the inner chamber 26 may have varying dimension areas, such as a minor internal diameter adjacent the closed bottom end, and a major diameter adjacent the up-standing edge.

The ball joint assembly 10 further includes a resilient pre-load member 28 which, in the preferred embodiment, comprises a Belleville washer type spring, particularly a metal Belleville washer type spring 28. Notwithstanding, the resilient preload member 28 could be configured of other spring-like materials and spring configurations, including a coil spring, bent leaf spring, compressible elastomeric material, or any other known resilient material or composition which can be elastically deformed to provide a spring force to pre-load ball and socket assembly 10 and meet other requirements of the components of assembly 10, such as resistance to oil, grease or other lubricants used in assembly 10. The resilient preload member 28 is disposed inside the inner chamber 26, adjacent the closed bottom end.

An inner bearing 30 rests upon the resilient preload member 28, within the inner chamber 26 of the housing 14. The inner bearing 30 is preferably, although not necessarily, of all metal construction in design for particularly demanding applications which require especially durable product designs. Inner bearing 30 may also be made from certain engineering plastic materials, ceramics, various composites and combinations of the above. The inner bearing 30 includes a generally flat bottom surface bearing in pressing contact against the resilient preload member 28. A lubrication passage 32 aligns with the lubrication passage 22 through the threaded post 20 so as to communicate grease pushed therethrough onto a wear surface 34. The ball portion 12 may be semi-spherical, ellipsoidal or any suitable curvilinear profile, and is placed in sliding contact with the wear surface 34 of the inner bearing 30 and provides an articulation surface when the ball and socket assembly 10 is placed in compression loading mode. In the embodiment shown in FIGS. 1, 1A and 2, the wear surface 34 is semi-spherical; however, wear surface 34 may have any surface profile which is suited for operative bearing engagement with ball portion 12 such as, for example, semi-spherical, ellipsoidal and other curvilinear shapes and profiles. These curvilinear profiles may also include surfaces which have combinations of curvilinear and linear elements as is well-known in the art associated with bearing surfaces for ball portion 12 members. Preferably, the inner bearing 30 has a diameter sized for a close clearance fit within the inner chamber 26 of the housing 14.

Figure 1:
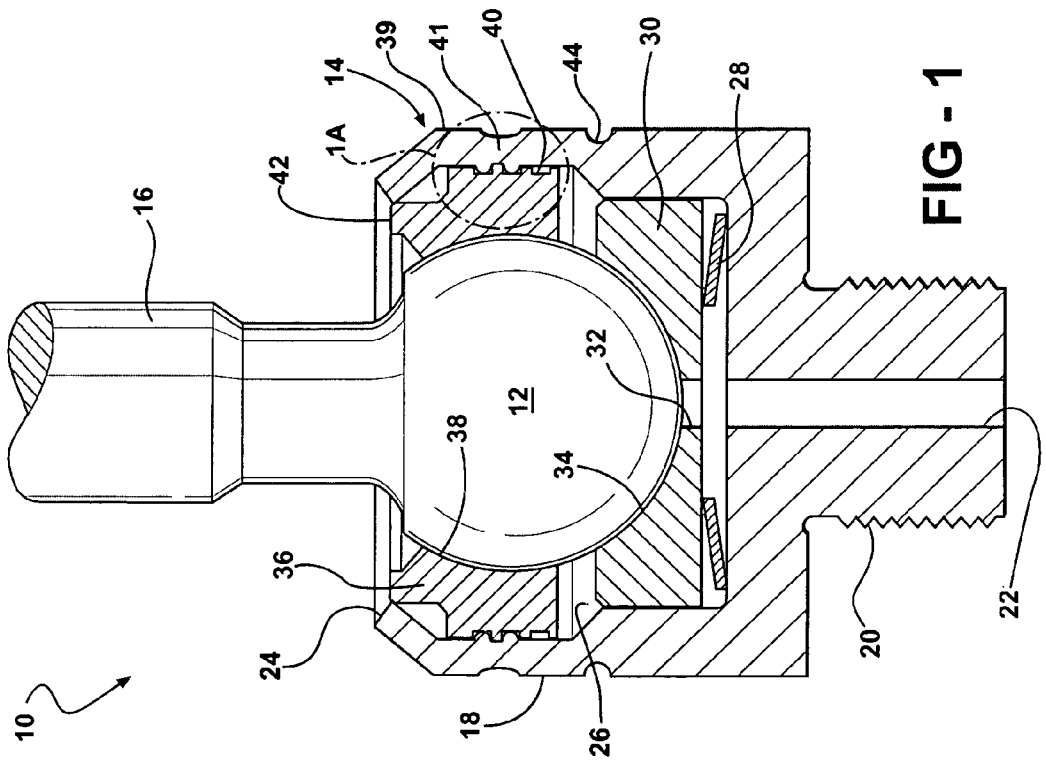
FIG. 1 is a cross-sectional view of a ball and socket assembly according to the subject invention.

An outer bearing 36 also has a wear surface 38 which captures an upper portion of the ball end 12 as viewed from FIG. 1 so as to hold the ball and socket assembly in articulating, sliding contact during tensile loading modes of operation. The outer bearing 36 slides over the shank 16 and seats within the inner chamber 26 adjacent its up-standing edge 24. The outer surface 39 of the outer bearing 36 may include ring-like ribs 40. The outer surface of bearing 36 has a slip fit or sliding contact relationship with the inner surface of the sidewall 18 when bearing 36 is installed within sidewall 18. The slip fit allows bearing 36 to be positioned axially within sidewall 18 prior to its position being fixed, as further described herein. The outer bearing 36 also includes an axially extending rim 42 which, when loaded into the housing 14, faces in a direction away from the inner chamber 26. Outer bearing 36 may be made from the same materials as that of inner bearing 30; however, each of inner bearing 30 and outer bearing 36 may be made from any of the materials mentioned above, and these materials may be selected independently from one another. Further, outer bearing 36 may also utilize a profile that is semi-spherical as shown in FIG. 1, or may have any of the profiles described above with respect to inner bearing 30, and the profiles of inner bearing 30 and outer bearing 36 may be selected independently from one another, so long as they are adapted for operative engagement with ball portion 12 in the manner described herein.

The outer surface of the sidewall 18 may be provided with a retaining groove 44 for the purpose of retaining a dust boot 46 such as depicted in FIGS. 7 and 8. A band or wire clamp 48 may be employed to help hold the dust boot 46 in position on the exterior of the housing 14. However, other well-known apparatus and means for retaining dust boot 46 may also be employed, such as certain other clamping members, retention features such as protruding lips on one or both of the boot or housing, adhesives and the like. Also, the employment of groove 44 dust boot 46 and a clamping means 48 is optional, since in some embodiments of ball joint assembly 10, a dust boot is not required, or need not be attached directly to the exterior of housing 14.

Referring now to FIGS. 3-6, a method of assembling the subject ball and socket assembly 10 is depicted, wherein a fixed pre-load compression is established between the articulating components. The method comprises the steps of placing into the housing 14 the preload member 28, followed by the inner bearing 30, the ball portion 12 and finally the outer bearing 36, with the wear surfaces 34, 38 of the inner 30 and outer 36 bearings placed into sliding contact with the ball portion 12. Once these components have been assembled together, the compression loading tool 50 is placed into contact with the rim 42 on the outer bearing 36. The loading tool 50 is illustratively depicted as a cage-like device, but in practice may take any suitable form. A compressive load 52 is then placed on the loading tool 50 until such time as an overload compression condition 54 is reached. The overload compression condition 54 represents an essentially solid component condition under which the inner bearing 30, ball portion 12 and outer bearing 36 are subjected to compressive stresses in excess of the desired pre-load and sufficient to remove the axial lash from the ball and socket assembly 10. The method further includes reducing the compression stresses within the resilient spring member 28 until an ideal compression condition 56 is achieved between the outer bearing 36, the ball stud 12 and the inner bearing 30. Alternately, rather than imposing an overload compression condition 54, loading tool 50 may be used to compress the components to an ideal condition 56 directly, without first achieving an overload condition. Simple dial gauges superimposed over the compressive load 52 are used to artistically represent the change in compressive loading between overload 54 and ideal 56 conditions. During the step of reducing the compression stress, the resilient preload member 28 is committed to relax slightly, until a prescribed amount of clearance between the components and a fixed preload of the ball and socket assembly 10 is established between the bottom of the inner bearing 30 and the closed bottom end in the inner chamber 26. While loading tool 50 continues to apply a compressive load which is maintained at the ideal compression condition 56, a staking operation simultaneously deforms the sidewall 18 of the housing 14 into the rings 40 of the outer bearing 36, as shown in FIG. 5. This staking operation fixes or locks the axial position of outer bearing 36 within the housing 14 by pressing sidewall 18 into pressed contact with outer surface 39 of outer bearing 36, thereby fixing the ideal compression condition 56 and preload within the ball and socket assembly 10. The staking operation results in at least one, and preferably a plurality of discrete indentations 58 disposed about the housing 14 as perhaps best shown in FIG. 2. In a preferred embodiment, these indentations 58 represent deformation of sidewall 18 and are transferred through the sidewall 18 and the deformed portion 41 of sidewall 18 is pressed into the rings 40 about the outer bearing 36, thus fixing its axial position within housing 14 so that the loading tool 50 can be removed. Alternately, rather than just staking in discreet locations around the periphery of housing 14, other means and methods of deforming sidewall 18 may be employed in order to deform a portion 41 of sidewall 18 into a mating capture feature, such as ring grooves 40, located on the outer surface 39 of outer bearing 36. For example, roll-forming or spin-forming a groove into sidewall 18 may be used to form a deformed portion 41 of sidewall 18 having the shape of a inwardly protruding rings 58' which may operatively engage with ring grooves 40 of outer bearing 36. As is also shown in FIG. 6, when staking is employed, optionally, the staking tool 62 may be left in place during subsequent forming operations as described below, in order to further ensure that the position of outer bearing 36 is maintained within housing 14 during these operations. Even after the loading tool 50 is removed, the ideal compression condition 56 and preload of ball and socket assembly 10 is maintained between the various articulating components.

In FIG. 6, an optional step is depicted wherein an up-standing edge 24 of the sidewall 18 is used to further ensure that the ideal compression condition 56 and preload of the ball and socket assembly 10 is maintained. In the embodiment illustrated in FIGS. 1, 1A and 2, the up-standing edge 24 of sidewall 18 is re-formed so as to capture outer bearing 36 on axially extending rim 42. Crimping rollers 60 graphically illustrate this operation; however, a pressing or other metal re-forming operation may be used to re-form the up-standing edge 24 and further fix the outer bearing 36 in position, such as spin-forming, roll-forming and other well-known re-forming methods for closing up-standing edge 24 against outer bearing 36 in pressing contact.

Accordingly, the method as described here for controlling the pre-load and clearance in an all metal ball and socket assembly 10 results in higher production through-puts and improved tolerance quality. Specifically, the step of positioning and fixing the outer bearing 36 prior to the final re-forming operation enables the subject ball and socket assembly 10 to be manufactured to a higher quality standard at lower costs.

Obviously, many modifications and variations of the present invention are possible in light of the above teachings. It is, therefore, to be understood that within the scope of the appended claims, the invention may be practiced otherwise than as specifically described.

What is claimed is:

1. A method of assembling a ball-and-socket type mechanism with a fixed pre-load compression, said method comprising the steps of:
   providing a housing having a sidewall with an up-standing edge, a resilient preload member, an inner bearing having a wear surface, an articulating ball stud, and an outer bearing having a wear surface;
   placing into the housing the resilient member, the inner bearing against the resilient member, the ball stud in sliding contact with the wear surface of the inner bearing, and the outer bearing with its wear surface in sliding contact with the ball stud;
   compressing the outer bearing, ball stud and inner bearing as a unit against the resilient member until an ideal compression condition is achieved without deforming the housing; and
   maintaining the ideal compression condition while simultaneously fixing a position of the outer bearing in the housing and thereby creating a capture feature to capture the ideal compression condition between the outer bearing, the ball stud and the inner bearing, wherein said step of fixing the outer bearing in a position in the housing includes deforming at least a portion of the sidewall of the housing into pressing contact with the outer bearing without disturbing the up-standing edge of the sidewall.

2. The method of claim 1 wherein said compressing step includes compressing a Belleville washer.

3. The method of claim 1 further including re-forming the upstanding edge of the housing after said step of deforming at least a portion of the sidewall of the housing.

4. The method of claim 1 wherein said step of providing a inner bearing includes forming the inner bearing from a metal.

5. The method of claim 1 wherein said step of providing an outer bearing includes forming the outer bearing from a metal.

6. The method of claim 1 further including the step of coating the wear surfaces of the outer and inner bearings with lubricant.

7. The method of claim 1 further including the step of covering at least a portion of the ball-and-socket mechanism with a dust boot.

8. The method of claim 1 wherein said compressing step includes first compressing the outer bearing, ball stud and inner bearing as a unit against the resilient member until an over-load compression condition is reached, and then reducing the compression stress until the ideal compression condition is achieved.

9. A method of assembling a ball-and-socket type mechanism with a fixed pre-load compression, said method comprising the steps of:
providing a housing having a sidewall with an up-standing edge, a resilient preload member, an inner bearing having a wear surface, an articulating ball stud, and an outer bearing having a wear surface;
placing into the housing the resilient preload member, the inner bearing against the resilient preload member, the ball stud in sliding contact with the wear surface of the inner bearing, and the outer bearing with its wear surface in sliding contact with the ball stud;
compressing the outer bearing, ball stud and inner bearing as a unit against the resilient preload member until an over-load compression condition is reached without deforming the housing;
reducing the compression stress within the resilient preload member until an ideal compression condition is achieved between the outer bearing, ball stud and inner bearing;
maintaining the ideal compression condition while simultaneously fixing a position of the outer bearing in the housing and thereby creating a capture feature to capture the ideal compression condition between the outer bearing, the ball stud and inner bearing; and
wherein said step of fixing the outer bearing in a position in the housing includes deforming at least a portion of the sidewall of the housing into pressing contact with the outer bearing without disturbing the up-standing edge of the sidewall.

10. The method of claim 9 wherein said compressing step includes compressing a Belleville washer.

11. The method of claim 9 further including re-forming the upstanding edge of the housing after said step of deforming at least a portion of the sidewall of the housing.

12. The method of claim 9 wherein said step of providing a inner bearing includes forming the inner bearing from a metal.

13. The method of claim 9 wherein said step of providing an outer bearing includes forming the outer bearing from a metal.

14. The method of claim 9 further including the step of coating the wear surfaces of the outer and inner bearings with lubricant.

15. The method of claim 9 further including the step of covering at least a portion of the ball-and-socket mechanism with a dust boot.

* * * * *